United States Patent
Jung et al.

(10) Patent No.: US 11,855,827 B2
(45) Date of Patent: *Dec. 26, 2023

(54) METHOD AND APPARATUS FOR SYNCHRONIZATION SIGNALS AND RANDOM ACCESS FOR FLEXIBLE RADIO COMMUNICATION

(71) Applicant: Motorola Mobility LLC, Chicago, IL (US)

(72) Inventors: Hyejung Jung, Palatine, IL (US); Vijay Nangia, Woodridge, IL (US); Ravikiran Nory, Buffalo Grove, IL (US); Ziad Ahmad, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/207,665

(22) Filed: Mar. 20, 2021

(65) Prior Publication Data

US 2021/0211340 A1 Jul. 8, 2021

Related U.S. Application Data

(63) Continuation of application No. 15/595,947, filed on May 16, 2017, now Pat. No. 10,992,510.
(Continued)

(51) Int. Cl.
*H04L 27/26* (2006.01)
*H04L 5/00* (2006.01)
(Continued)

(52) U.S. Cl.
CPC .......... *H04L 27/266* (2013.01); *H04L 5/0048* (2013.01); *H04W 48/08* (2013.01);
(Continued)

(58) Field of Classification Search
CPC .......... H04W 74/004; H04W 74/0808; H04W 74/08; H04W 74/085; H04W 56/0015; H04L 27/266; H04L 5/0048

See application file for complete search history.

(56) References Cited

U.S. PATENT DOCUMENTS

| | | | |
|---|---|---|---|
| 2011/0039552 A1* | 2/2011 | Narasimha | H04W 76/19 455/425 |
| 2014/0161052 A1* | 6/2014 | Kazmi | H04L 5/0041 370/329 |

(Continued)

OTHER PUBLICATIONS

Papanikolaou, European Search Report, European Application No. EP 22 15 1477, European Patent Office The Hague, Munich, Germany, dated Mar. 10, 2022.
(Continued)

*Primary Examiner* — Omer S Mian
(74) *Attorney, Agent, or Firm* — Loppnow & Chapa; Matthew C. Loppnow

(57) ABSTRACT

A method and apparatus provide synchronization signals and random access for flexible radio communication. Information can be received from a base station. The information can include a plurality of subcarrier spacings and at least one random access configuration for a cell. Each of the at least one random access configuration can be associated with at least one subcarrier spacing of the plurality of subcarrier spacings. The at least one subcarrier spacing can be used for communication. A random access configuration can be selected from the at least one random access configuration. A random access preamble can be transmitted according to the selected random access configuration.

17 Claims, 8 Drawing Sheets

Related U.S. Application Data

(60) Provisional application No. 62/402,825, filed on Sep. 30, 2016.

(51) Int. Cl.
*H04W 74/08* (2009.01)
*H04W 72/23* (2023.01)
*H04W 48/08* (2009.01)
*H04W 48/20* (2009.01)
*H04W 56/00* (2009.01)
*H04W 74/00* (2009.01)
*H04L 5/14* (2006.01)
*H04W 84/04* (2009.01)

(52) U.S. Cl.
CPC ....... *H04W 48/20* (2013.01); *H04W 56/0015* (2013.01); *H04W 56/0045* (2013.01); *H04W 72/23* (2023.01); *H04W 74/004* (2013.01); *H04W 74/006* (2013.01); *H04W 74/0833* (2013.01); *H04L 5/001* (2013.01); *H04L 5/0035* (2013.01); *H04L 5/1469* (2013.01); *H04W 74/085* (2013.01); *H04W 84/042* (2013.01)

(56) References Cited

U.S. PATENT DOCUMENTS

2018/0049168 A1* 2/2018 Ryu .................. H04L 5/00
2018/0255490 A1* 9/2018 Hou .................. H04W 36/32
2018/0270867 A1* 9/2018 Yi .................. H04W 74/0833
2019/0174462 A1* 6/2019 Harada .................. H04L 5/0007

OTHER PUBLICATIONS

Lenovo: "Random Access Procedure for NB-Iot", 3GPP Draft; R1-161009, 3rd Generation Partnership Project (3GPP), Mobile Competence Centre; 650, Route Des Lucioles; F-06921 Sophia-Antipolis Cedex; France; vol. RAN WG1, No. 84 St Julian's, Malta; Feb. 15-19, 2016.

Nokia Networks: "Basic system design for UL NB-Iot", 3GPP Draft; R1-160041, 3rd Generation Partnership Project (3GPP), Mobile Competence Centre; 650, Route Des Lucioles; F-06921 Sophia-Antipolis Cedex; France vol. RAN WG1, Budapest, HU; Jan. 18-20, 2016.

Intel Corporation: "NB-PRACH and random access procedure", 3GPP Draft; R1-160415—Intel NB-Iot RA, 3rd Generation Partnership Project (3GPP), Mobile Competence Centre; 650, Route Des Lucioles; F-06921 Sophia-Antipolis Cedex; France vol. RAN WG1, No. 84 St Julian's, Malta; Feb. 16-19, 2016.

Panasonic: "Use of multiple numerologies in NR", 3GPP Draft; R1-167439, 3rd Generation Partnership Project (3GPP), Mobile Competence Centre; 650, Route Des Lucioles; F-06921 Sophia-Antipolis Cedex; France; vol. RAN WGI1 No. 86, Gothenburg, Sweden, Aug. 2-26, 2016.

ETRI: "Considerations on random access design", 3GPP Draft; R1-157544, Considerations on Random Access Design, 3rd Generation Partnership Project (3GPP), Mobilecompetence Centre; 650, Route Des Lucioles; F-06921 Sophia-Antipolis Cedex; France; vol. RAN WG1, No. 83, Anaheim, USA; Nov. 16-20, 2015.

* cited by examiner

METHOD AND APPARATUS FOR SYNCHRONIZATION SIGNALS AND RANDOM ACCESS FOR FLEXIBLE RADIO COMMUNICATION

BACKGROUND

1. Field

The present disclosure is directed to a method and apparatus for synchronization signals and random access for flexible radio communication.

2. Introduction

Presently, wireless communication devices, such as User Equipments (UEs), communicate with other communication devices using wireless signals over different Radio Access Technologies (RATs). In the fifth generation (5G) RAT or a new RAT (NR), a network configures multiple numerology, such as multiple subcarrier spacing, sets in a given carrier to serve UEs with different speeds and/or to satisfy different service requirements, such as latency. Methods related to flexibly locating downlink Synchronization Signals (SS) in the frequency domain are used. One of the benefits of flexible frequency location of SS is to allow the use of a common SS for the multiple configured numerology sets in the carrier, without an increased guard band overhead or scheduling restriction. The common SS with a predefined subcarrier spacing and a predefined transmission bandwidth may be beneficial in terms of reducing UE cell search receiver complexity and SS overhead. On the other hand, the SS should be able to provide similar relative timing accuracy with respect to symbol duration for all the configured numerologies.

A Random Access Channel (RACH) is used for uplink synchronization. A UE may perform random access procedures upon arrival of Uplink (UL) or Downlink (DL) data when uplink is not synchronized, for handover, for initial access, for recovery from radio link failure, or for the case that the UE is UL synchronized but no Scheduling Request (SR) resource is assigned. In a cell configured with multiple subcarrier spacings for data and/or control channels, a Physical Random Access Channel (PRACH) should also be able to provide proper uplink synchronization accuracy for all the configured subcarrier spacings.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for synchronization signals and random access for flexible radio communication. According to a possible embodiment, downlink orthogonal frequency division multiplexing signals including a synchronization signal can be received. The synchronization signal can be transmitted with a first subcarrier spacing and a first bandwidth. Cell detection can be performed using the received downlink orthogonal frequency division multiplexing signals to detect at least one cell. A cell of the at least one detected cell can be selected. Information of at least one subcarrier spacing associated with the selected cell can be received. The at least one subcarrier spacing can be used for communication. A second subcarrier spacing can be selected from the at least one subcarrier spacing. Fine downlink timing information can be obtained from an extended synchronization signal having a second bandwidth when the selected second subcarrier spacing is larger than the first subcarrier spacing. Transmitting can be performed using the fine downlink timing information.

According to another possible embodiment, downlink orthogonal frequency division multiplexing signals including a synchronization signal can be transmitted. The synchronization signal can be transmitted with a first subcarrier spacing and a first bandwidth. Information of a plurality of subcarrier spacings can be sent. An extended synchronization signal can be transmitted if the plurality of subcarrier spacings include a second subcarrier spacing that is larger than the first subcarrier spacing. The extended synchronization signal can have a second bandwidth larger than the first bandwidth. Communication can be received from a user equipment using fine downlink timing information obtained from the extended synchronization signal.

According to another possible embodiment, information can be received from a base station. The information can include a plurality of subcarrier spacings and at least one random access configuration for a cell. Each of the at least one random access configuration can be associated with at least one subcarrier spacing of the plurality of subcarrier spacings. The at least one subcarrier spacing can be used for communication. A random access configuration can be selected from the at least one random access configuration. A random access preamble can be transmitted according to the selected random access configuration.

According to another possible embodiment, information can be sent to a user equipment. The information can include a plurality of subcarrier spacings and at least one random access configuration for a cell. Each of the at least one random access configuration can be associated with at least one subcarrier spacing of the plurality of subcarrier spacings. A random access preamble can be received from the user equipment according to a random access configuration from the at least one random access configuration.

Figure 1:
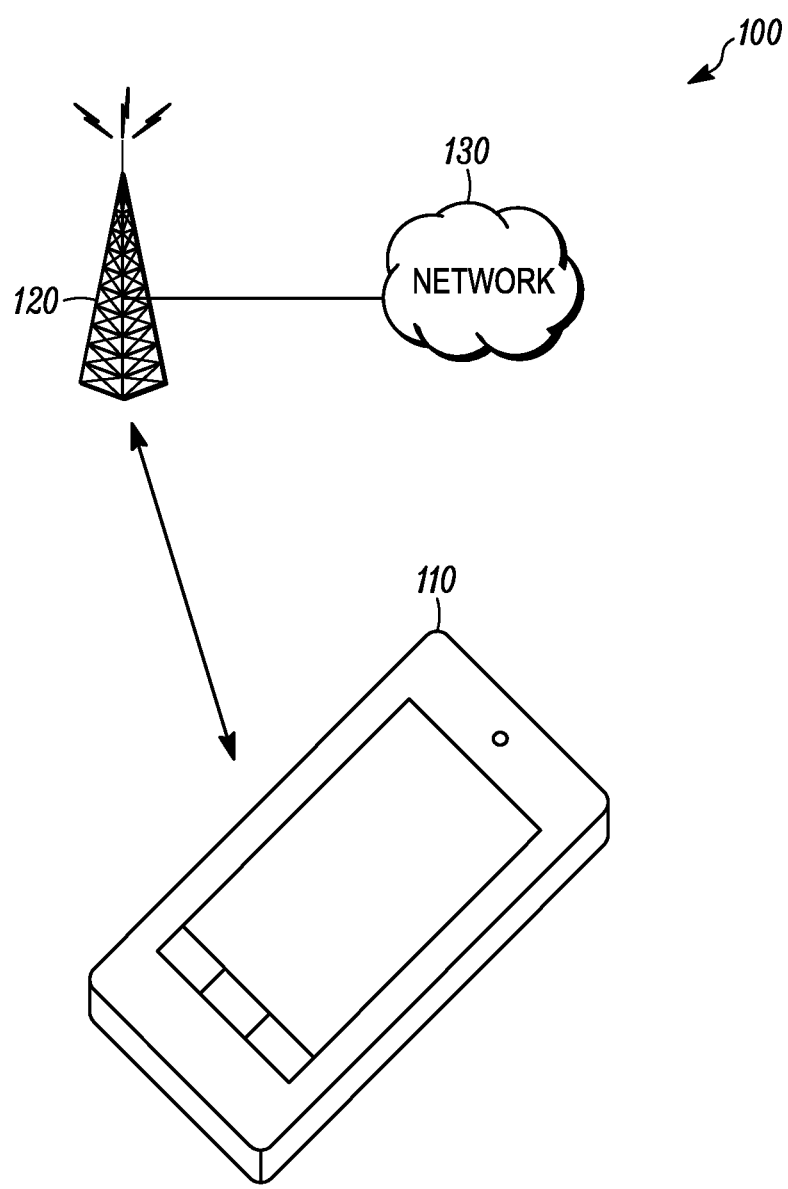
FIG. 1 is an example block diagram of a system according to a possible embodiment.

FIG. 1 is an example block diagram of a system 100 according to a possible embodiment. The system 100 can include a wireless communication device 110, such as a User Equipment (UE), a base station 120, and a network 130. The UE 110 can be a wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, such as a fourth generation (4G) network, a fifth generation (5G) or New Radio (NR) network, and/or other 3GPP-based network, a satellite communications network, a high altitude platform network, the Internet, and/or other communications networks. The base station 120 can be an enhanced NodeB (eNB), a 5G or NR NodeB (gNB), an unlicensed spectrum base station, an access point, or any other device that can provide wireless communication between a UE and a network.

In operation, the UE 110 can communicate with the base station 120 using wireless communication signals, such as 5G signals. These signals can include control and data signals. For example, the UE 110 can receive Synchronization Signals (SSs), such as Primary Synchronization Signals (PSSs) and Secondary Synchronization Signals (SSSs), from the base station 120 to obtain an identity of a cell of the base station 120 and frame timing.

SSs with single subcarrier spacing and a transmission bandwidth predefined in the 3GPP specification may not provide sufficient synchronization accuracy for a certain data/control channel numerology, such as 60 KHz subcarrier spacing for data/control channels and 15 KHz subcarrier spacing with approximately 1 MHz transmission bandwidth for SS. To the contrary, if SS are always transmitted with 60 KHz subcarrier spacing and ~4 MHz transmission bandwidth, radio resources can be wasted for cells only configured with 15 KHz subcarrier spacing for data/control channels. Furthermore, UEs with limited operating bandwidth capability, such as low cost Machine-Type Communication (MTC) UEs, may not be able to detect the SS. If a subcarrier spacing of SS is selected by a network entity on the network 130 from the set of possible numerologies, this may require the UE 110 to blindly detect the selected subcarrier spacing and accordingly, may increase the UE 110 receiver complexity.

In Long Term Evolution (LTE), a transmission bandwidth for Physical Random Access Channel (PRACH) can be limited within 6 resource blocks (RBs) of 1.08 MHz for all PRACH formats, where a RB can include 12 subcarriers with 15 KHz subcarrier spacing. This can approximately provide timing estimation accuracy within ±0.5 µs for 4.7 µs Cyclic Prefix (CP) duration. However, 6RB PRACH bandwidth may not be sufficient to provide required timing estimation accuracy, such as within ±0.15 µs, for synchronized uplink data/control reception with 60 KHz subcarrier spacing and CP duration of 1.17 µs.

According to a possible embodiment, a Downlink (DL) SS design can be used that can provide necessary DL synchronization accuracy for multiple configured numerologies without causing unnecessary increase of SS overhead and UE receiver complexity. According to another possible related embodiment, random access procedures and PRACH configurations can be used that are suitable for supporting different types of services and UEs in a cell based on different numerologies.

According to another possible related embodiment, in an SS structure, a PSS can include a baseline PSS sequence and an additional sequence that is appended to the baseline PSS sequence, if necessary. Whether to append the additional sequence or not and the length of the appended sequence can depend on numerology configuration in a cell. Necessary synchronization accuracy can be provided for all configured numerologies together with efficient utilization of radio resources. Furthermore, as the UE 110 uses only the baseline PSS sequence for cell detection, the additionally appended sequence may neither increase UE cell detection complexity nor impact bandwidth limited UEs camping on the cell.

According to a possible random access procedure, a UE that camps on or is served by a cell configured with multiple subcarrier spacings for data/control channels can initially select an appropriate subcarrier spacing for the data/control channels and a corresponding PRACH configuration, including PRACH subcarrier spacing and transmission bandwidth, out of one or more PRACH configurations in the cell. The UE decision can be based on combination of its speed, Quality of Service (QoS) requirements of the traffic, its hardware capability, estimates on channel conditions such as path loss and Signal-to-Interference and Noise ratio (SINR), and/or other information.

Selecting a proper PRACH configuration for the selected numerology of data/control channels can provide required UL timing synchronization accuracy. Accordingly, the UE that successfully completes the random access procedure can be ready for following UL data and control transmissions, without further timing adjustment or additional preamble transmission. Furthermore, the UE 110 can implicitly indicate its traffic type, such as latency requirement, and operational capability, such as the maximum supportable transmission bandwidth.

According to a possible embodiment, a baseline numerology including Subcarrier (SC) spacing can be specified for a given frequency range, such as 15 KHz SC for sub-6 GHz, 60 KHz SC for frequency bands between 6 GHz and 30 GHz, and 240 KHz for above-30 GHz, and the SC spacing of the baseline numerology can be used for transmission of PSS, SSS, and essential System Information (eSI). Furthermore, a common set of PSS and SSS sequences can be used for all operating frequency bands so that a UE can employ similar or common baseband processing for all the operating frequency bands. According to a possible implementation, both PSS and SSS sequences can be used to represent a cell Identity (ID). According to another possible implementation, PSS sequences can used only for time and frequency acquisition, and SSS sequences can be used for representing the cell ID and other information, such as duplexing mode.

Figure 2:
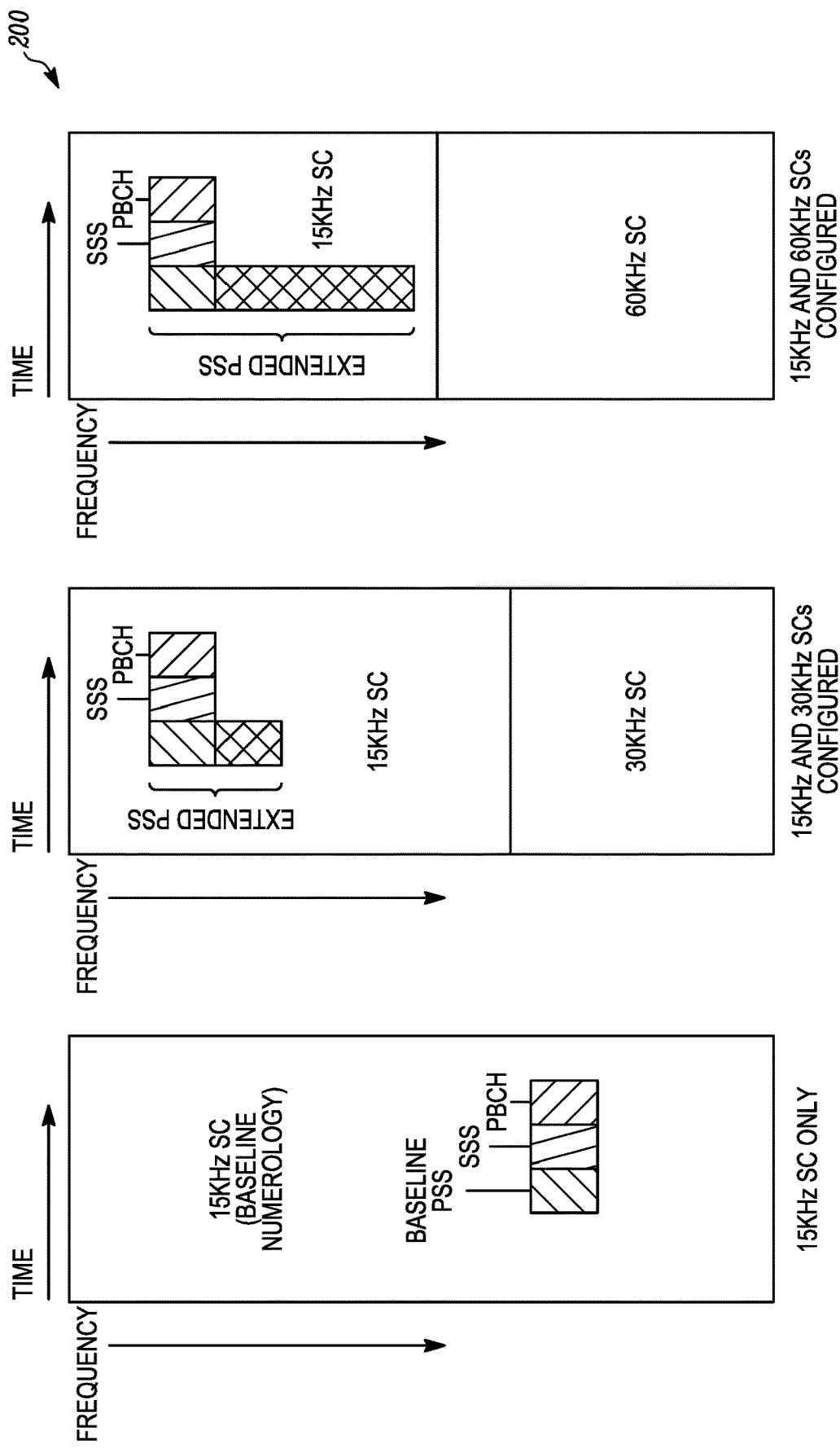
FIGS. 2A-2C are illustrations of examples of flexible bandwidth PSS with various numerology configurations in a cell according to a possible embodiment.

FIGS. 2A-2C are illustrations 200 of examples of flexible bandwidth PSS with various numerology configurations in a cell according to a possible embodiment. A network can extend PSS in the frequency domain with an additional sequence, if a subcarrier spacing of data/control channels larger than a subcarrier spacing of PSS is configured in a cell. The network can determine an extended transmission bandwidth of PSS such that the extended PSS can provide at least similar relative timing accuracy with respect to symbol duration for all configured data/control channel numerologies.

A UE can perform timing and frequency acquisition for the baseline numerology and cell identification by detecting a baseline PSS, such as a non-extended PSS, and SSS. The baseline PSS, SSS, and eSI can be transmitted within a certain limited bandwidth, such as 1.08 MHz, so that low cost/bandwidth limited UEs can also detect PSS/SSS and decode an eSI channel. According to a possible implementation, the UE can obtain configured numerologies in a cell from broadcast system information messages. During handover, configured numerologies in a target cell can be indicated by the network as a part of mobility control information, such as handover command, dedicated higher layer signaling. If the cell is configured with multiple subcarrier spacings and if the UE decides or is indicated by the network to use a subcarrier spacing larger than the baseline subcarrier spacing for data/control channels, the UE can perform additional fine timing synchronization with the extended PSS.

Table 1 presents examples of synchronization signal parameters taking into account a flexible PSS structure according to a possible embodiment. One length-15 Zadoff-Chu (ZC) sequence can be used for a baseline PSS sequence (denoted as ZC1), and a length-18 (denoted as ZC2) or length-54 (denoted as ZC2') ZC sequence can be used for an appended PSS sequence. The resulting extended PSS can be mapped to a wider frequency band for increased timing estimation accuracy. In order to handle a potential large frequency offset, such as 10-20 parts per million (ppm) observed during initial access, PSS sequences can be mapped on every fourth subcarrier. This can reduce the number of hypotheses on frequency offset when coarse timing and frequency information is acquired. An SSS sequence can be mapped to consecutive subcarriers to use a longer sequence for a given transmission bandwidth, which can make more number of sequences available for SSS. Different configurations can be as follows:

2× scaling of subcarrier spacing (e.g. 30 KHz, 120 KHz, or 480 KHz): ZC1 (6RB)+ZC2 (6RB)

4× scaling of subcarrier spacing (e.g. 60 KHz, 240 KHz, or 960 KHz): ZC1 (6RB)+ZC2' (18RB)

TABLE 1

Examples of synchronization signal parameters

| Carrier frequency range | $f_c < 6$ GHZ | $6 \le f_c \le 30$ GHz | $f_c > 30$ GHz |
|---|---|---|---|
| Carrier bandwidth | 1.4 MHz or larger | 5 MHz or larger | 20 MHz or larger |
| Subcarrier spacing for PSS/SSS (Baseline subcarrier spacing) | 15 KHz | 60 KHz | 240 KHz |
| Additional subcarrier spacing supported | 30 KHz, 60 KHz | 120 KHz, 240 KHz | 480 KHz, 960 KHz |
| PSS sequence mapping | On every 4th subcarrier (excluding guard subcarriers) | | |
| Baseline PSS sequence length | 15 | | |
| Appended PSS sequence length | 18 (2× subcarrier scaling), 54 (4× subcarrier scaling) | | |
| SSS sequence mapping | On every subcarrier (excluding guard subcarriers) | | |

TABLE 1-continued

Examples of synchronization signal parameters

| Carrier frequency range | $f_c < 6$ GHZ | $6 \le f_c \le 30$ GHz | $f_c > 30$ GHz |
|---|---|---|---|
| SSS sequence length | 61 | | |
| Baseline PSS/SSS transmission bandwidth including guard subcarriers | 1.08 MHz | 4.32 MHz | 17.28 MHz |
| Extended PSS transmission bandwidth including guard subcarriers | 2.16 MHz, or 4.32 MHz | 8.64 MHz, or 17.28 MHz | 34.56 MHz, or 69.12 MHZ |

According to a possible embodiment, the baseline PSS, such as the non-extended PSS, can be the only PSS defined and the SSS can be transmitted. In a broadcast system information message, such as a Physical Broadcast Channel (PBCH) message, the UE can receive an indication on the location and/or bandwidth of a timing reference signal from a set of possible values. The bandwidth of a timing reference signal can be determined by the eNB/gNB based on the supported subcarrier spacing(s) in the cell. The UE can use the timing reference signal to achieve fine timing synchronization. The UE can use a portion of the timing reference signal depending on its UE capability, such as maximum supported bandwidth, maximum supported subcarrier spacing, configured subcarrier spacing for DL and UL data/control channels, and other capabilities.

The number of cell search hypothesis can be reduced by defining a cell search frequency raster separately from the frequency raster, such as 100 kHz, that is used to define the carrier channel bandwidth. The cell search frequency raster can be defined on per operating band basis and can be restricted to multiples of the frequency raster, such as 100 kHz, that is used to define the carrier channel bandwidth. Selection of the value for the cell search frequency raster can be dependent on the bandwidth of the synchronization signal and the minimum supported channel bandwidth for the operating band. If the minimum supported channel bandwidth is 1.4 MHz, such as 6RBs, and bandwidth of the synchronization signal are approximately the same, such as 1.4 MHz, again, such as 6RBs for 15 KHz subcarrier spacing, then defining a cell search frequency raster larger than the 100 kHz frequency raster can reduce the flexibility in placement of the carrier channel in the operating band.

If a cell is configured with a subcarrier spacing of data/control channels larger than a baseline subcarrier spacing to support low latency communication and high speed UEs, at least UEs with good channel conditions, such as high SINR, can complete random access preamble transmission in short time duration upon arrival of delay-sensitive traffics. In addition, the minimum Physical Random Access Channel (PRACH) transmission bandwidth required to guarantee a certain timing estimation accuracy can be different for each data/control channel numerology, such as subcarrier spacing. Thus, a network can configure a separate PRACH resource and PRACH format, such as PRACH transmission time and bandwidth, PRACH subcarrier spacing, for each data/control channel numerology configuration. A UE can select a data/control channel numerology initially based on various criteria, and can indicate its selection to the network by using a PRACH/Random Access Channel (RACH) configuration associated with the selected data/control channel numerology.

According to a possible embodiment, the network can configure one or more PRACH/RACH configurations in a cell configured with multiple data/control channel numerologies including multiple subcarrier spacings. Each PRACH/RACH configuration can be associated with at least one subcarrier spacing of data/control channels. For contention-based random access, the UE can select one PRACH/RACH configuration from the one or more configured PRACH/RACH configurations in the cell. Some random access related parameters may be common for all the configured subcarrier spacings of data/control channels.

Figure 3:
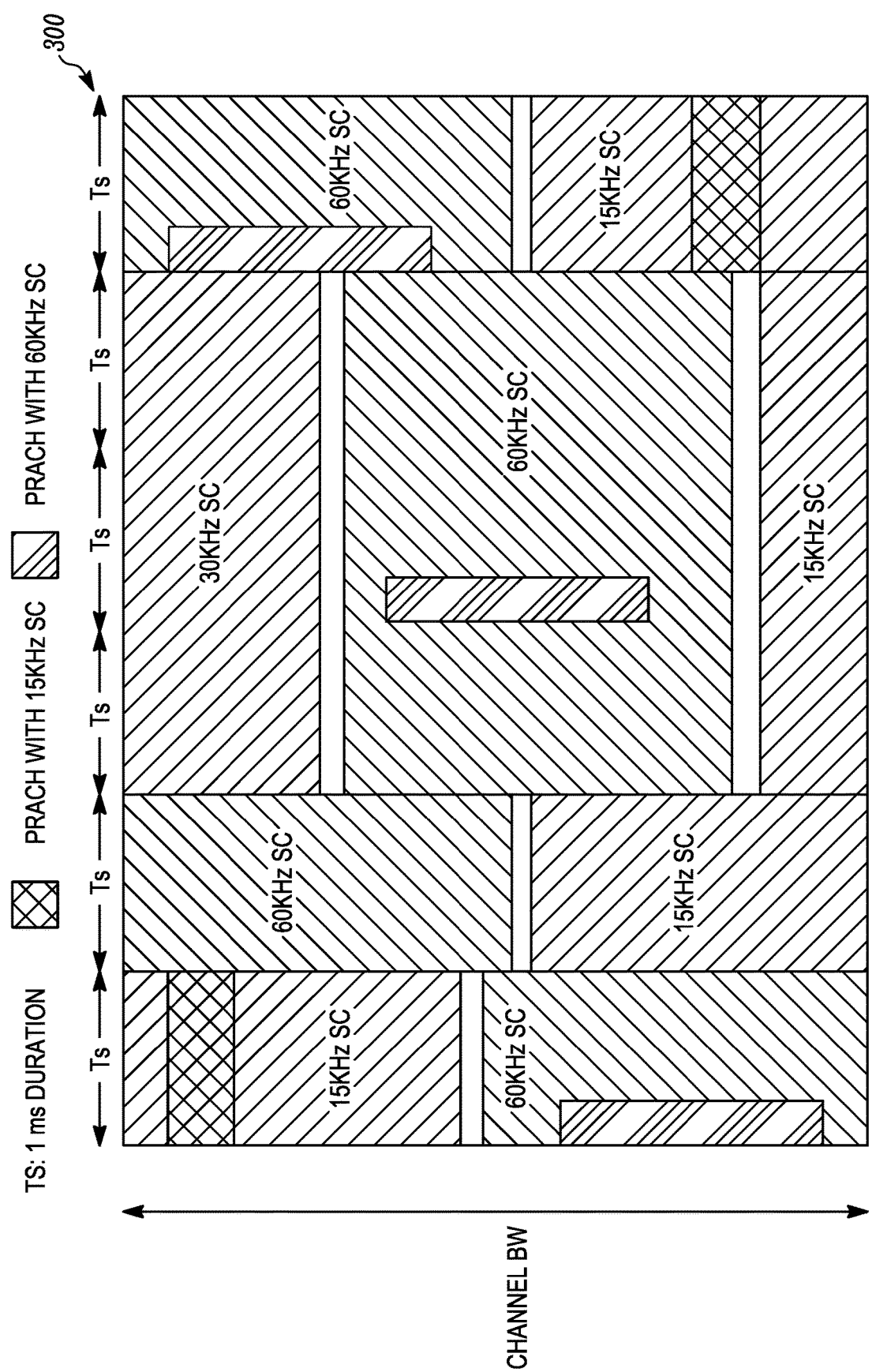
FIG. 3 is an example illustration of PRACH resource configuration in a cell configured with multiple subcarrier spacings according to a possible embodiment.

FIG. 3 is an example illustration 300 of PRACH resource configuration in a cell configured with multiple subcarrier spacings, such as 15 KHz, 30 KHz, and 60 KHz, according to a possible embodiment. The UE can select a PRACH/RACH configuration based on the DL path loss. If DL path loss is less than a threshold, then the UE can select a PRACH/RACH configuration with short transmission time duration, such as a large PRACH subcarrier spacing, otherwise, the UE can select a PRACH/RACH configuration with a large transmission time duration, such as a small PRACH subcarrier spacing. According to a possible related embodiment, the UE can select a PRACH/RACH configuration based on the UL transmit power capability. For example, the UE can select a PRACH/RACH configuration with the shortest possible transmission time duration such that the UE is not power limited.

For example, after cell detection, a UE can receive information of the configured data/control channel numerologies and the associated PRACH/RACH configurations for the detected cell. According to a possible embodiment, the number of configured PRACH/RACH configurations may not be the same as the number of configured data/control channel subcarrier spacings in order to reduce PRACH overhead and PRACH/RACH configuration signaling overhead. As shown in the illustration 300, the network can configure three subcarrier spacings, such as 15 KHz, 30 KHz, and 60 KHz, for data/control channels, but can configure only two PRACH configurations, such as PRACH with 15 KHz subcarrier spacing and PRACH with 60 KHz subcarrier spacing. In this case, the PRACH with 15 KHz subcarrier spacing can be associated with data/control channels with 15 KHz or 30 KHz subcarrier spacing, and the PRACH with 60 KHz subcarrier spacing can be associated with data/control channels with 30 KHz or 60 KHz subcarrier spacing. The UE using the data/control channels of 30 KHz subcarrier spacing can select one of the PRACH configurations, depending on pathloss and/or bandwidth capability. If the PRACH with 15 KHz subcarrier spacing is used, the UE may have to adjust a slight uplink timing misalignment later via receiving and applying a timing advance adjustment command transmitted from the network.

The UE can select a proper data/control channel numerology based on combination of its speed, a traffic type based on QoS requirements, a UE type or UE capability, and/or path loss estimation and transmit power status. According to a possible embodiment, one or more numerology selection criteria may be predefined in a spec. For example, a bandlimited MTC UE can be set to select a subcarrier spacing of 15 KHz or smaller. If the subcarrier spacing of 15 KHz or smaller is not configured in a cell, the bandlimited MTC UE may not camp on that cell but may select another cell. Alternatively, the bandlimited MTC UE can select the smallest subcarrier spacing, such as 30 KHz, configured in the cell, if it supports a transmission bandwidth of the associated PRACH/RACH configuration. Then, the UE can be subsequently reconfigured with a more suitable numerology, such as subcarrier spacing, during random access or connection set-up procedures.

According to another possible embodiment, a certain numerology selection criterion can be signaled in the system information, as a dedicated Radio Resource Control (RRC) message, or as the Downlink Control Information (DCI) in a Physical Downlink Control Channel PDCCH. For example, UE speed threshold values can be signaled to assist UEs selecting a numerology of data/control channels and a corresponding PRACH/RACH configuration. This can be signaled as:

UESpeed-ThresholdsPrachInfoList::=SEQUENCE
(SIZE(1 . . . 3)) OF UESpeed-Range

The UE can perform detection of an extended PSS, if necessary, to further refine DL timing for the selected numerology of data/control channels, and can perform random access procedures, such as by transmitting a random access preamble, according to the PRACH/RACH configuration associated with the selected numerology.

In a Random Access Response (RAR) message, the network can include information of one or more backoff parameters each of which can be specific to one PRACH/RACH configuration. The UE can consider that the backoff parameter is set to 0ms for the PRACH/RACH configuration without the signaled backoff parameter. Based on the backoff parameters, the UE can select a random backoff time for each PRACH/RACH configuration according to a uniform distribution between 0 and the backoff parameter of a given PRACH/RACH configuration. According to a possible implementation, the UE can select the PRACH/RACH configuration with the smallest backoff time among the PRACH/RACH configurations that the UE can support for subsequent preamble transmission. This can be used for redistribution of RACH loads across resources of different PRACH/RACH configurations.

Table 2 presents examples of per-numerology PRACH format according to a possible embodiment, where the subcarrier spacing for PRACH can be the same as the subcarrier spacing of the data channel. The subcarrier spacing and transmission bandwidth of PRACH can also scale with the subcarrier spacing of data/control channels. If PRACH preambles are constructed from cyclic shift of ZC sequences, restriction on cyclic shift values can be applied to a PRACH format with a larger subcarrier spacing.

TABLE 2

Examples of per-numerology PRACH format

| | Numerology 1 | Numerology 2 |
|---|---|---|
| Subcarrier spacing | 15 KHz | 60 KHz |
| Transmission bandwidth including guard band | 1.08 MHz | 4.32 MHz |
| Transmission time including guard time | 1 ms | 0.25 ms |

According to a possible embodiment, a contention-free RACH procedure can be used for RRC connected UEs, upon DL data arrival where the uplink is not synchronized or during handover. As the network has already acquired the UE capability information in terms of supported numerology sets, the network can select a proper data/control channel numerology for the UE and a corresponding PRACH/RACH configuration, considering a DL traffic type and/or numerology configurations of a target cell. A downlink control channel that orders a UE to perform random access can carry an indication of a PRACH/RACH configuration selected from one or more configured PRACH/RACH configurations of a cell in addition to a preamble index and PRACH resource selection, such as a PRACH mask index. Similarly, dedicated random access parameters in a dedicated RRC message for a handover command can include an indication of the selected PRACH/RACH configuration from the one or more configured PRACH/RACH configurations, as shown as the "ra-RACHConfigSelectionIndex INTEGER (0 . . . 3)" below.

| RACH-ConfigDedicated Information Element | |
|---|---|
| -- ASN1START | |
| RACH-ConfigDedicated ::= | SEQUENCE { |
| ra-PreambleIndex | INTEGER (0 .. 63), |
| ra-PRACH-MaskIndex | INTEGER (0 .. 15), |
| ra-PRACHConfigSelectionIndex | INTEGER (0 .. 3) |
| } | |
| -- ASN1STOP | |

In a random access response message, the network can include an indication of a desired numerology for subsequent data and control communication if the previously selected and indicated PRACH/RACH configuration is associated with multiple data/control channel numerologies or if the network changes a numerology selection for data/control channels for the UE.

Figure 4:
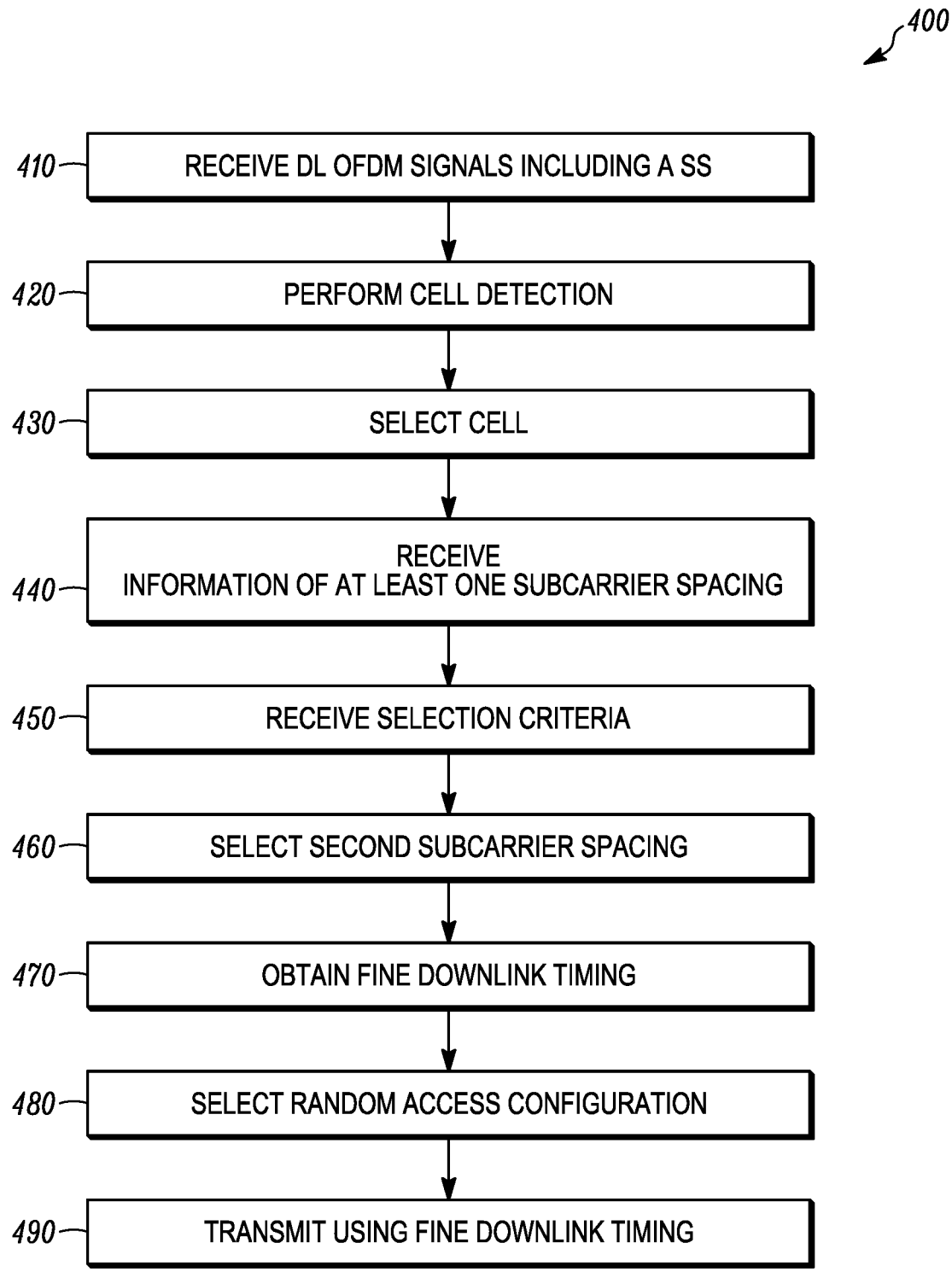
FIG. 4 is an example flowchart illustrating the operation of a wireless communication device according to a possible embodiment.

FIG. 4 is an example flowchart 400 illustrating the operation of a wireless communication device, such as the UE 110, according to a possible embodiment. At 410, downlink Orthogonal Frequency Division Multiplexing (OFDM) signals including a SS can be received. The SS can be transmitted with a first subcarrier spacing and a first bandwidth. The subcarrier spacing can be based on the bandwidth of a subcarrier in the frequency domain, which can affect the length of an OFDM symbol in the time domain. Different subcarrier spacings can have different width subcarriers and different length OFDM symbols. The first subcarrier spacing and the first bandwidth can be predefined for a given carrier frequency range.

At 420, cell detection can be performed using the received downlink OFDM signals to detect at least one cell. Performing cell detection can include acquiring DL timing and frequency information, determining a cell identity, performing a mobility measurement, and/or other operations for performing cell detection. The DL timing information can have a first resolution. At 430, a cell of the at least one detected cell can be selected.

At 440, information of at least one subcarrier spacing associated with the selected cell can be received. The at least one subcarrier spacing can be used for communication. The communication can be a data communication and/or a control communication. The received information can include a plurality of subcarrier spacings and at least one random access configuration for the selected cell. Each of the at least one random access configuration can be associated with at least one subcarrier spacing of the plurality of subcarrier spacings.

At 450, selection criteria information can be received using a broadcast system information message, a dedicated higher layer message, downlink control information in physical downlink control channel, and/or using any other method of receiving selection criteria information. At 460, a second subcarrier spacing can be selected from the at least one subcarrier spacing. The second subcarrier spacing can be selected based on a UE speed, a traffic type, a UE type, a UE capability, a downlink path loss estimate, and/or other criteria. The second subcarrier spacing can also be selected using the predefined selection criteria. The second subcarrier spacing can further be selected using the received selection criteria information.

At 470, fine downlink timing information can be obtained from an extended SS having a second bandwidth when the selected second subcarrier spacing is larger than the first subcarrier spacing. The second bandwidth can be larger than the first bandwidth. The extended SS can include the SS transmitted with the first bandwidth and/or can be a subsequent SS transmission. The extended SS with the second bandwidth can also include a SS with the first bandwidth with and an additional sequence appended to the SS in the frequency domain. According to a possible implementation, the SS can be a sequence transmitted with the first bandwidth and the extended SS can be the sequence and an additional sequence with the second bandwidth. According to another possible implementation, the SS can include a first sequence transmitted with the first bandwidth and the extended SS can include a second sequence with the second bandwidth. The second sequence can include one or more sequences, where a length of at least one of the one or more sequences can be the same as a length of the first sequence. The fine downlink timing information can be obtained from a timing reference signal. The fine downlink timing information can be used for transmitting UL communications, for receiving DL communications, and/or for other communication. A larger subcarrier spacing can include a larger subcarrier bandwidth in the frequency domain, where OFDM symbols can be shorter in the time domain. For example, when obtaining fine downlink timing, DL timing with a first resolution can be obtained from the SS and DL timing with a second resolution can be obtained from the extended SS, where the second resolution can be higher than the first resolution. A wider SS bandwidth can result in a higher timing resolution. According to a possible implementation, the extended SS may be received from a network only if a subcarrier spacing larger than the first subcarrier spacing is configured in the cell. According to another possible implementation, obtaining fine DL timing information can include obtaining DL timing information with a second resolution higher than the first resolution.

At 480, a random access configuration associated with the selected second subcarrier spacing can be selected. At 490, transmissions can be made using the fine downlink timing information. According to a possible implementation, a random access preamble can be transmitted according to the selected random access configuration and using the fine downlink timing information.

Figure 5:
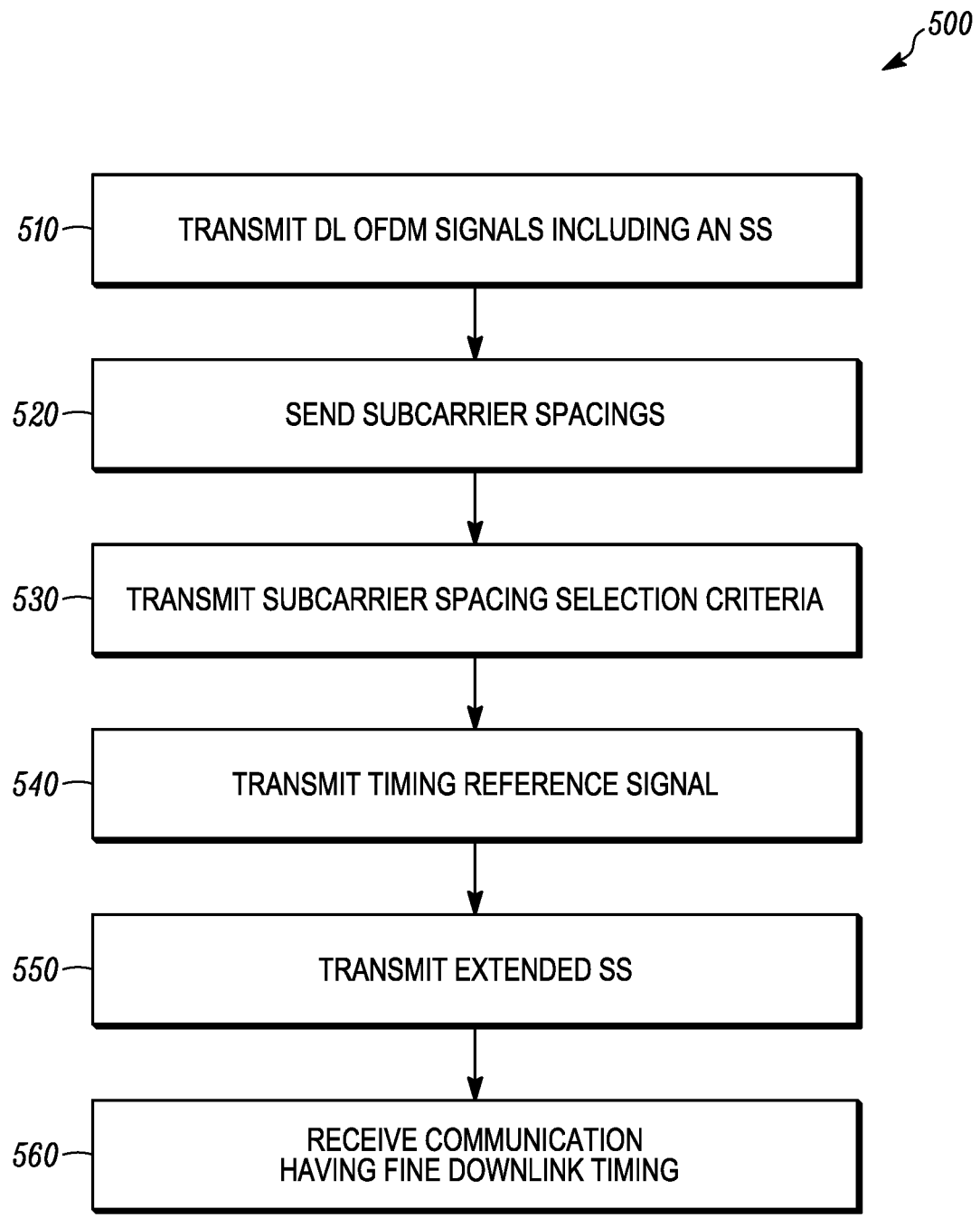
FIG. 5 is an example flowchart illustrating the operation of a wireless communication device according to a possible embodiment.

FIG. 5 is an example flowchart 500 illustrating the operation of a wireless communication device, such as the base station 120, according to a possible embodiment. At 510, downlink OFDM signals including a SS can be transmitted. The SS can be transmitted with a first subcarrier spacing and a first bandwidth. The first subcarrier spacing and the first bandwidth can be predefined for a given carrier frequency range.

At 520, information of a plurality of subcarrier spacings can be sent. The sent information can include the plurality of subcarrier spacings and at least one random access configuration. A random access configuration from the at least one random access configuration can be associated with at least one subcarrier spacing of the plurality of subcarrier spacings.

At 530, subcarrier spacing selection criteria information can be transmitted to a UE using a broadcast system information message, using a dedicated higher layer message, using downlink control information in physical downlink control channel, and/or using any other method. At 540, a timing reference signal can be transmitted. The timing reference signal can allow the UE to obtain the fine downlink timing information.

At 550, an extended SS can be transmitted if the plurality of subcarrier spacings include a second subcarrier spacing that is larger than the first subcarrier spacing. The extended SS can have a second bandwidth larger than the first bandwidth. According to a possible implementation, the extended SS with the second bandwidth can be an SS with the first bandwidth and an additional sequence appended to the SS in the frequency domain. According to another possible implementation, the SS can include a sequence transmitted with the first bandwidth and the extended SS can include the sequence and an additional sequence with the second bandwidth. According to another possible implementation, the SS can include a first sequence transmitted with the first bandwidth and the extended SS can include a second sequence with the second bandwidth. According to a possible implementation, the SS can allow the UE to obtain DL timing information with a first resolution and the extended SS can allow the UE to obtain fine DL timing information with a second resolution higher than the first resolution.

At 560, communication can be received from a UE where the UE can transmit the communication using fine downlink timing information obtained from the extended SS. Communication from the UE can be based on the second subcarrier spacing. According to a possible implementation, a random access preamble according to the random access configuration can be received from the UE. The UE can transmit the random access preamble using fine downlink timing information obtained from the extended SS.

Figure 6:
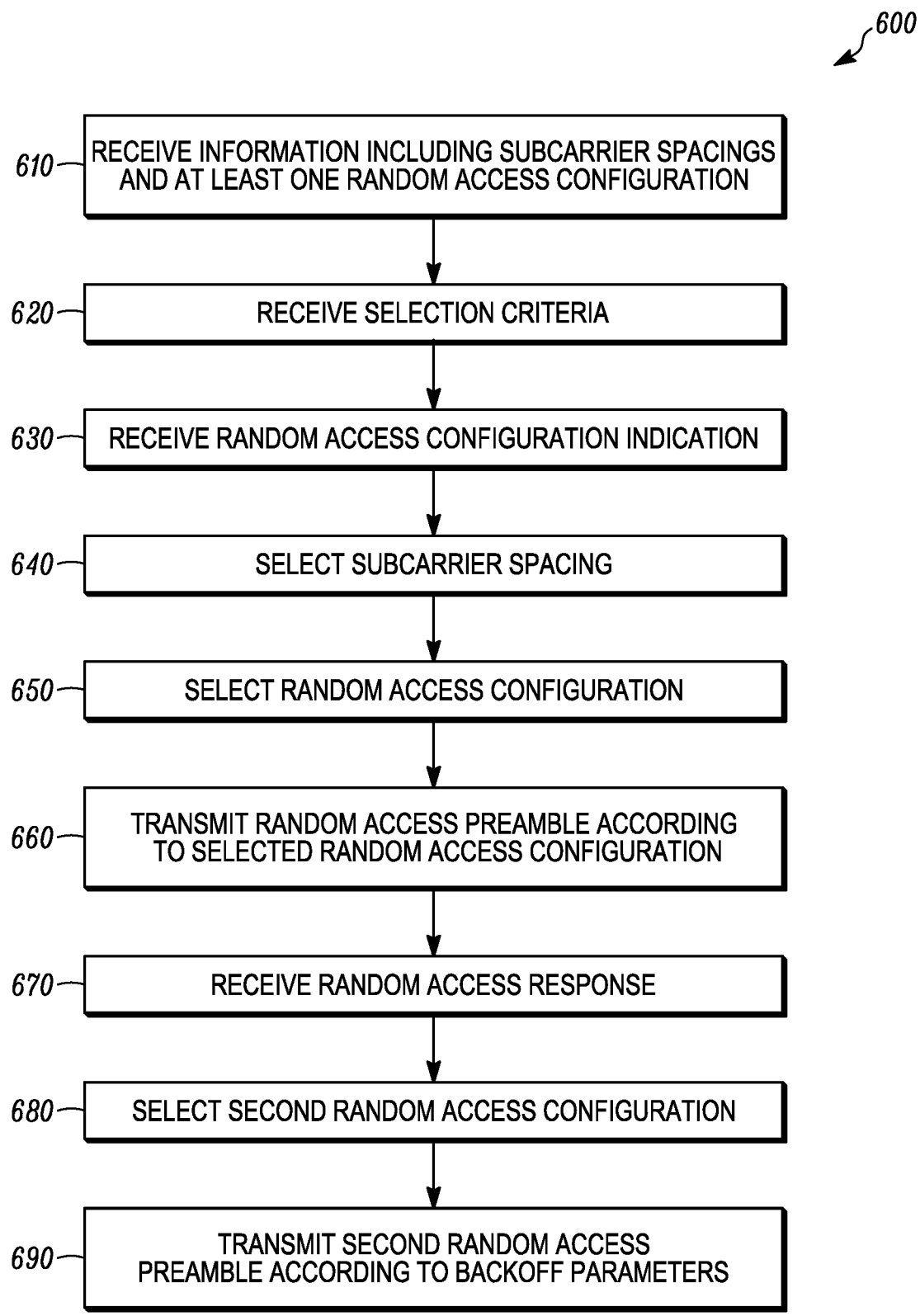
FIG. 6 is an example flowchart illustrating the operation of a wireless communication device according to a possible embodiment.

FIG. 6 is an example flowchart 600 illustrating the operation of a wireless communication device, such as the UE 110, according to a possible embodiment. At 610, information can be received from a base station. The information can include a plurality of subcarrier spacings and at least one random access configuration for a cell. Each of the at least one random access configuration can be associated with at least one subcarrier spacing of the plurality of subcarrier spacings. The at least one subcarrier spacing can be used for communication. A subcarrier spacing can be based on the bandwidth of a subcarrier in the frequency domain, which can affect the length of an OFDM symbol in the time domain. Different subcarrier spacings can have different width subcarriers and different length OFDM symbols. Larger subcarrier spacing can include larger subcarrier bandwidth in the frequency domain, where OFDM symbols can be shorter in the time domain. Each of the at least one random access configuration can include at least information of a transmission bandwidth and a transmission duration of Physical Random Access Channel (PRACH).

At 620, selection criteria information can be received using a broadcast system information message, a dedicated higher layer message, downlink control information in physical downlink control channel, and/or can be received by any other method. At 630, an indication can be received from the base station. The indication can explicitly indicate a random access configuration to select.

At 640, a subcarrier spacing can be selected from the plurality of subcarrier spacings. The subcarrier spacing can be selected based on a UE speed, a traffic type, a UE type, a UE capability, a downlink path loss estimate, and/or based on any other method or information. The subcarrier spacing can include selecting a smaller subcarrier spacing of the plurality of subcarrier spacings when the UE has limited bandwidth capability. A larger subcarrier spacing of the plurality of subcarrier spacings can be selected when supporting low latency communication.

At 650, a random access configuration can be selected. The random access configuration may or may not be associated with the selected subcarrier spacing. According to a possible implementation, the random access configuration can be a RACH configuration associated with one or more configured subcarrier spacings. For example, the random access configuration can be selected based on the one or more subcarrier spacings and/or the selected subcarrier spacing. Each of the at least one random access configuration can include at least information of a transmission bandwidth and a transmission duration of a PRACH. According to a possible implementation, the random access configuration can also be selected based on the random access configuration indication received from the base station. The random access configuration can also be selected using predefined selection criteria. The random access configuration can further be selected using the received selection criteria information.

At 660, a random access preamble can be transmitted according to the selected random access configuration. At 670, a random access response message can be received. The random access response message can include information of one or more backoff parameters each of which is specific to one random access configuration. According to a possible implementation, the random access configuration can be associated with a first subcarrier spacing and the random access response message can include an indication of a second subcarrier spacing to use for subsequent communication.

At 680, a second random access configuration for a second random access preamble can be selected. The selected second random access configuration can have a smallest backoff time among the at least one random access configuration for a cell. At 690, a second random access preamble can be transmitted according to the one or more backoff parameters. For example, the second random access preamble can be transmitted according to the information of a backoff parameter specific to the selected second random access configuration.

Figure 7:
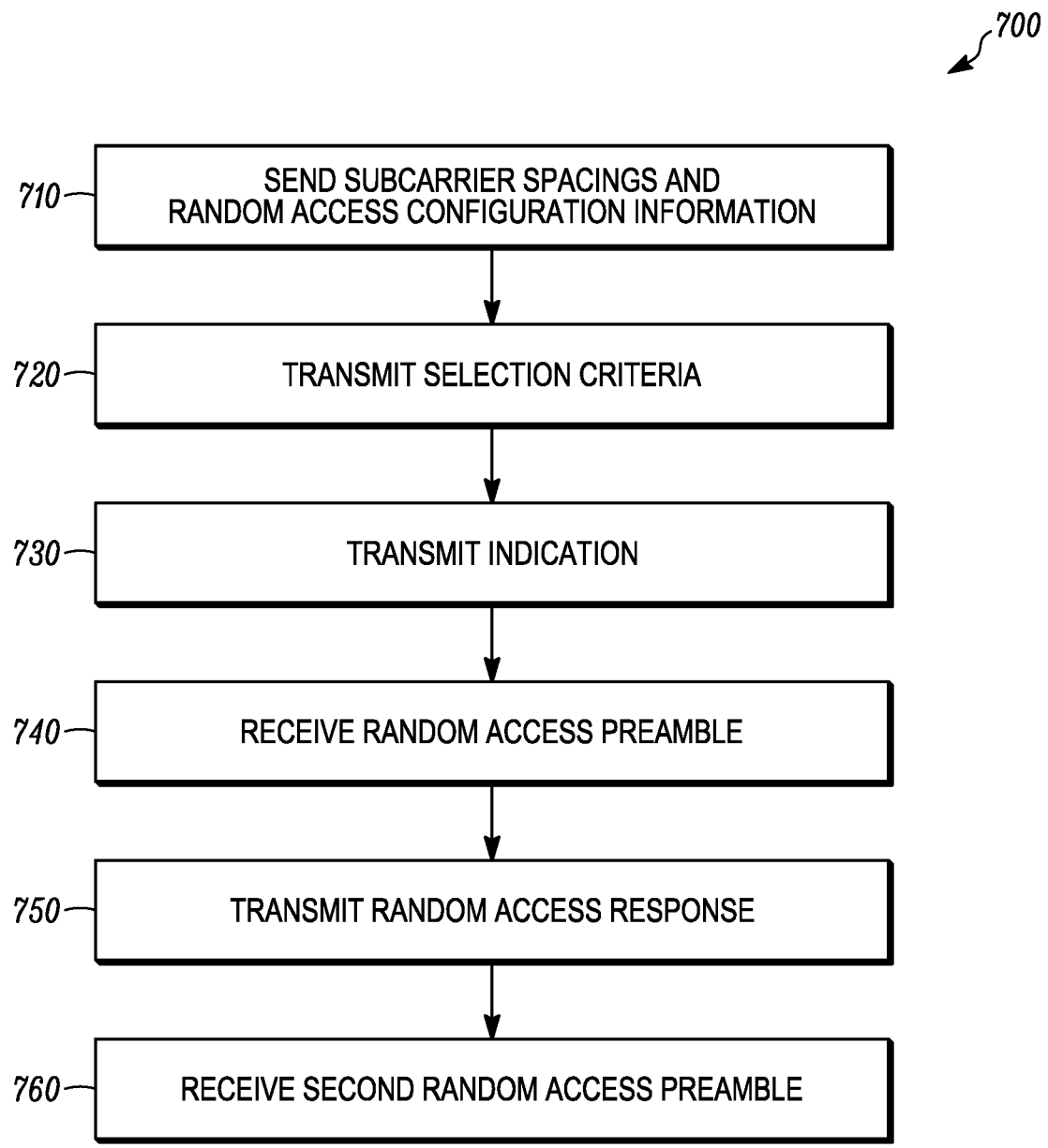
FIG. 7 is an example flowchart illustrating the operation of a wireless communication device according to a possible embodiment.

FIG. 7 is an example flowchart 700 illustrating the operation of a wireless communication device, such as the base station 120, according to a possible embodiment. At 710, information can be sent to a UE. The information can include a plurality of subcarrier spacings and at least one random access configuration for a cell. Each of the at least one random access configuration can be associated with at least one subcarrier spacing of the plurality of subcarrier spacings. Also, each of the at least one random access configuration can include at least information of a transmission bandwidth and a transmission duration of a PRACH.

At 720, selection criteria information can be transmitted using a broadcast system information message, a dedicated higher layer message, downlink control information in physical downlink control channel, and/or any other method. At 730, an indication can be transmitted to the UE. The indication can explicitly indicate the random access configuration for the UE to select.

At 740, a random access preamble can be received from the UE according to a random access configuration from the at least one random access configuration. The random access configuration may or may not be based on a subcarrier spacing selected from the plurality of subcarrier spacings. The random access preamble can also be based on the indication transmitted to the UE. The selected subcarrier spacing can be based on a UE speed, a traffic type, a UE type, a UE capability, a downlink path loss estimate, and/or other information. The selected subcarrier spacing can be a smaller subcarrier spacing of the plurality of subcarrier spacings when the UE has limited bandwidth capability. The selected subcarrier spacing can also be a larger subcarrier spacing of the plurality of subcarrier spacings for low latency communication. The random access configuration can be selected using predefined selection criteria. The random access configuration can be selected additionally based on the transmitted selection criteria information.

At 750, a random access response message can be transmitted. The random access response message can include information of one or more backoff parameters each of which is specific to one random access configuration. The random access configuration can be associated with a first subcarrier spacing and the transmitted random access response message can include an indication of a second subcarrier spacing for the UE to use for subsequent communication.

At 760, a second random access preamble can be received according to the one or more backoff parameters. A second random access configuration for the second random access preamble can have a smallest backoff time among the at least one random access configuration for the cell.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
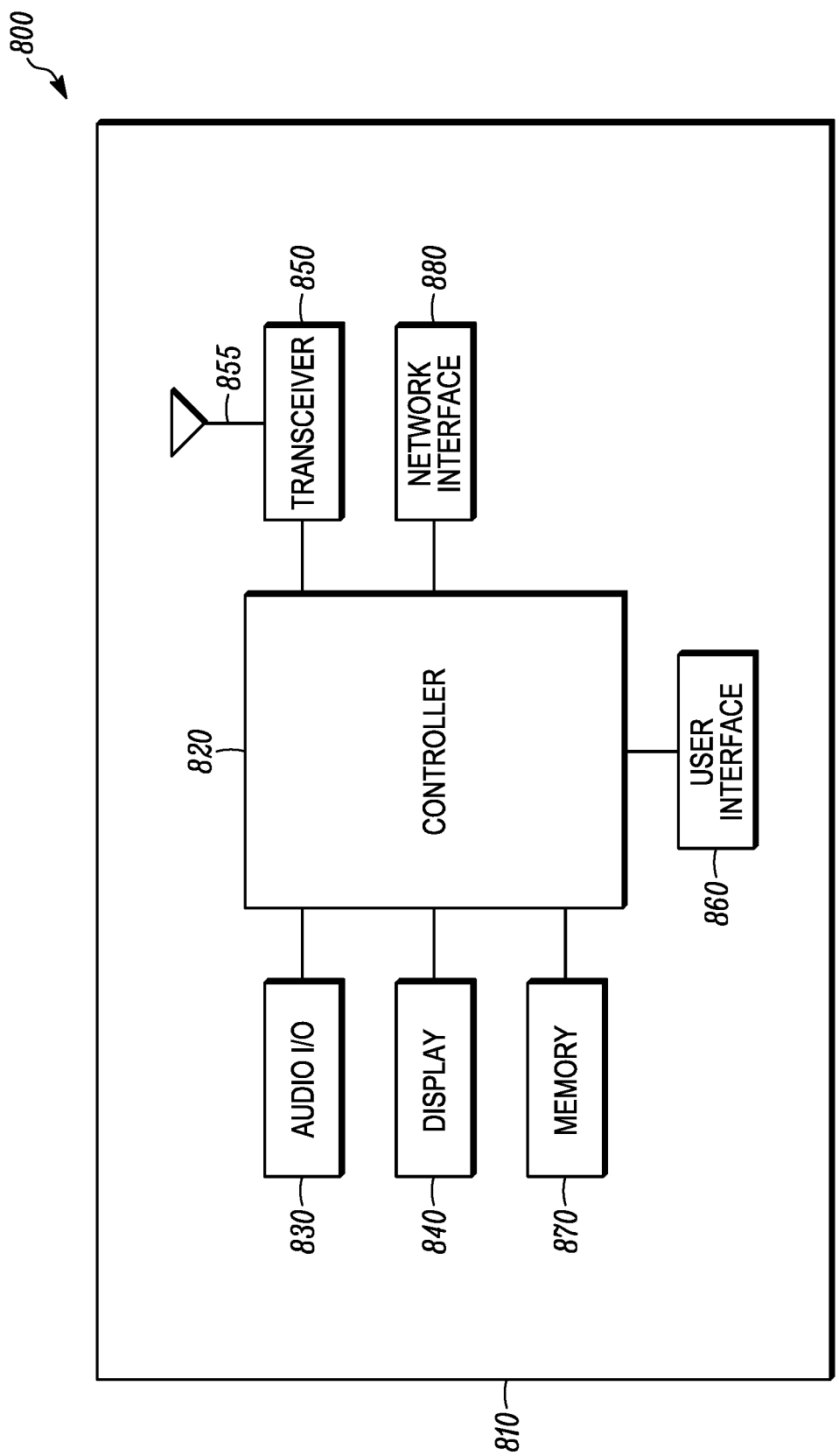
FIG. 8 is an example block diagram of an apparatus according to a possible embodiment.

FIG. 8 is an example block diagram of an apparatus 800, such as the UE 110 and/or the base station 120, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, an antenna 855 coupled to the transceiver 850, a user interface 860 coupled to the controller 820, a memory 870 coupled to the controller 820, and a network interface 880 coupled to the controller 820. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 870 can include a random access memory, a read only memory, an optical memory, a flash memory, a removable memory, a hard drive, a cache, or any other memory that can be coupled to an apparatus.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating an apparatus and implementing the disclosed embodiments. Some or all of the additional elements of the apparatus 800 can also perform some or all of the operations of the disclosed embodiments.

According to a possible embodiment, the apparatus 800 can be a UE. The transceiver 850 can receive downlink OFDM signals including a SS. The SS can be transmitted with a first subcarrier spacing and a first bandwidth. The first subcarrier spacing and the first bandwidth can be predefined for a given carrier frequency range.

The controller 820 can perform cell detection using the received downlink OFDM signals to detect at least one cell and select a cell of the at least one detected cell. Performing cell detection can include acquiring downlink timing and frequency information, determining a cell identity, performing a mobility measurement, and/or other operations. Performing cell detection can also include obtaining DL timing information with a first resolution. Obtaining fine DL timing information can include obtaining DL timing information with a second resolution higher than the first resolution.

The transceiver 850 can receive information of at least one subcarrier spacing associated with the selected cell, where the at least one subcarrier spacing can be used for communication. The received information can include a plurality of subcarrier spacings and at least one random access configuration for the selected cell. Each of the at least one random access configuration can be associated with at least one subcarrier spacing of the plurality of subcarrier spacings. The controller 820 can select a random access configuration associated with the selected second subcarrier spacing.

The transceiver 850 can receive selection criteria information using a broadcast system information message, a dedicated higher layer message, downlink control information in physical downlink control channel, and/or other methods. The controller 820 can obtain the fine downlink timing information from a timing reference signal. The controller 820 can also select a second subcarrier spacing from the at least one subcarrier spacing and obtain fine downlink timing information from an extended SS having a second bandwidth when the selected second subcarrier spacing is larger than the first subcarrier spacing. The second bandwidth can be larger than the first bandwidth. The transceiver 850 may receive the extended SS from a network only if a subcarrier spacing larger than the first subcarrier spacing is configured in the cell. The second subcarrier spacing can be selected based on a UE speed, a traffic type, a UE type, a UE capability, a downlink path loss estimate, and/or other information. The second subcarrier spacing can also be selected using predefined selection criteria. The second subcarrier spacing can additionally be selected using the received selection criteria information. The extended SS with the second bandwidth can be a SS with the first bandwidth with and an additional sequence appended to the SS in the frequency domain. Also, the SS can be a sequence transmitted with the first bandwidth and the extended SS can be the sequence and an additional sequence with the second bandwidth. The SS can further be a first sequence transmitted with the first bandwidth and the extended SS can be a second sequence with the second bandwidth.

The transceiver 850 can transmit using the fine downlink timing information. The random access preamble can be transmitted according to the selected random access configuration as well as using the fine downlink timing information.

According to another possible embodiment, the apparatus 800 can be a base station. The controller 820 can control operations of the apparatus 800. The transceiver 850 can transmit downlink OFDM signals including a SS. The SS can be transmitted with a first subcarrier spacing and a first bandwidth. The first subcarrier spacing and the first bandwidth can be predefined for a given carrier frequency range.

The transceiver 850 can send information of a plurality of subcarrier spacings. The sent information can include the plurality of subcarrier spacings and at least one random access configuration, where a random access configuration from the at least one random access configuration can be associated with at least one subcarrier spacing of the plurality of subcarrier spacings.

The transceiver 850 can transmit subcarrier spacing selection criteria information to a UE using a broadcast system information message, a dedicated higher layer message, downlink control information in physical downlink control channel, and/or by any other method. The transceiver 850 can transmit a timing reference signal that allows the UE to obtain the fine downlink timing information.

The transceiver 850 can transmit an extended SS if the plurality of subcarrier spacings include a second subcarrier spacing that is larger than the first subcarrier spacing. The extended SS can have a second bandwidth larger than the first bandwidth. The extended SS with the second bandwidth can be an SS with the first bandwidth and an additional sequence appended to the SS in the frequency domain. Also, the SS can be a sequence transmitted with the first bandwidth and the extended SS can be the sequence and an additional sequence with the second bandwidth. Additionally, the SS can be a first sequence transmitted with the first bandwidth and the extended SS can be a second sequence with the second bandwidth. The SS can allow the UE to obtain DL timing information with a first resolution and the extended SS can allow the UE to obtain fine DL timing information with a second resolution higher than the first resolution.

The transceiver 850 can receive communication from a UE where the UE can transmit communication using fine downlink timing information obtained from the extended SS. Communication from the UE can be based on the second subcarrier spacing. The transceiver 850 can receive a random access preamble according to the random access configuration from the UE, where the UE can transmit the random access preamble using fine downlink timing information obtained from the extended SS.

According to a possible implementation, the controller 820 can generate the downlink OFDM signals including a SS, generate the information of a plurality of subcarrier spacings, determine whether the plurality of subcarrier spacings include a second subcarrier spacing that is larger than the first subcarrier spacing, generate the extended SS, and/or generate other information and signals transmitted by the transceiver 850.

According to another possible embodiment, the apparatus 800 can be a UE. The transceiver 850 can receive information from a base station. The information can include a plurality of subcarrier spacings and at least one random access configuration for a cell. Each of the at least one random access configuration can be associated with at least one subcarrier spacing of the plurality of subcarrier spacings. Each of the at least one random access configuration can include at least information of a transmission bandwidth and a transmission duration of PRACH. The at least one subcarrier spacing can be used for communication. The random access configuration can include at least information of a transmission bandwidth and a transmission duration of a PRACH.

The transceiver 850 can receive selection criteria information using a broadcast system information message, a dedicated higher layer message, and downlink control information in physical downlink control channel, and/or other method. The controller 820 can select a subcarrier spacing from the plurality of subcarrier spacings. The subcarrier spacing can be selected based on a UE speed, a traffic type, a UE type, a UE capability, a downlink path loss estimate, and/or other information. The subcarrier spacing can also be selected by selecting a smaller subcarrier spacing of the plurality of subcarrier spacings when the UE has limited bandwidth capability. The subcarrier spacing can further be selected by selecting a larger subcarrier spacing of the plurality of subcarrier spacings when supporting low latency communication.

The controller 820 can select a random access configuration from the at least one random access configuration. According to a possible implementation, the controller 820 can select a random access configuration associated with the selected subcarrier spacing. According to another possible implementation, the random access configuration can be selected using a predefined selection criteria. The random access configuration can also be selected using the received selection criteria information. According to another possible implementation, the transceiver 850 can receive an indication from the base station. The indication can explicitly indicate a random access configuration to select and the random access configuration can be selected based on the indication from the base station. The transceiver 850 can transmit a random access preamble according to the selected random access configuration.

The transceiver 850 can receive a random access response message that includes information of one or more backoff parameters each of which is specific to one random access configuration. The selected subcarrier spacing can include a selected first subcarrier spacing and the random access response message can include an indication of a second subcarrier spacing to use for subsequent communication. The controller 820 can select a second random access configuration for the second random access preamble. The selected second random access configuration can have a smallest backoff time among the at least one random access configuration for the cell. The transceiver 850 can transmit a second random access preamble according to the one or more backoff parameters.

According to another possible embodiment, the apparatus 800 can be a base station. The transceiver 850 can send information to a UE. The information can include a plurality of subcarrier spacings and at least one random access configuration for a cell. Each of the at least one random access configuration can be associated with at least one subcarrier spacing of the plurality of subcarrier spacings. Each of the at least one random access configuration can include at least information of a transmission bandwidth and a transmission duration of a PRACH. The random access configuration can include at least information of a transmission bandwidth and a transmission duration of a PRACH. According to a possible implementation, the controller 820 can generate the information including the plurality of subcarrier spacings, the at least one random access configuration, and/or other information and signals.

The transceiver 850 can transmit selection criteria information using at least one selected from a broadcast system information message, a dedicated higher layer message, downlink control information in physical downlink control channel, and/or any other method. The transceiver 850 can also transmit an indication to the UE. The indication can explicitly indicate the random access configuration for the UE to select.

The transceiver 850 can receive a random access preamble from the UE according to a random access configuration from the at least one random access configuration. The random access configuration may or may not be based on a subcarrier spacing selected from the plurality of subcarrier spacings. The selected subcarrier spacing can be based on a UE speed, a traffic type, a UE type, a UE capability, a downlink path loss estimate, and/or other information. The selected subcarrier spacing can be a smaller subcarrier spacing of the plurality of subcarrier spacings when the UE has limited bandwidth capability. The selected subcarrier spacing can also be a larger subcarrier spacing of the plurality of subcarrier spacings for low latency communication. The random access configuration can be selected using predefined selection criteria. The random access configuration can also be based on the transmitted selection criteria information. The received random access preamble can be based on the transmitted indication of the random access configuration.

The transceiver 850 can transmit a random access response message that includes information of one or more backoff parameters each of which is specific to one random access configuration. The random access configuration can be associated with a first subcarrier spacing and the random access response message including an indication of a second subcarrier spacing for the UE to use for subsequent communication. The transceiver 850 can receive a second random access preamble according to the one or more backoff parameters. A second random access configuration for the second random access preamble can have a smallest backoff time among the at least one random access configuration for the cell.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising: receiving a dedicated radio resource control message including dedicated random access parameters dedicated to the user equipment, the dedicated random access parameters including a subcarrier spacing value and a corresponding random access configuration, where the subcarrier spacing value and the corresponding random access configuration are selected by a network entity from a plurality of subcarrier spacing values and a plurality of random access configurations configured in a target cell of the user equipment, where the subcarrier spacing value is a first subcarrier spacing value for a physical random access channel, and where the dedicated radio resource control message further includes information of a second subcarrier spacing value to be used by the user equipment for a data channel and a control channel, and transmits a random access preamble according to the dedicated random access parameters.

2. The method according to claim 1, further comprising transmitting user equipment capability information, where the subcarrier spacing value and the corresponding random access configuration are based on the user equipment capability information.

3. The method according to claim 1, wherein the dedicated radio resource control message comprises a handover command.

4. The method according to claim 1, wherein transmitting the random access preamble comprises transmitting the random access preamble when performing a random access procedure for recovery from radio link failure.

5. The method according to claim 1, wherein the user equipment is in a radio resource control connected state.

6. An apparatus comprising:
a controller that controls operations of the apparatus; and
a transceiver coupled to the controller, where the transceiver receives a dedicated radio resource control message including dedicated random access parameters dedicated to the apparatus, the dedicated random access parameters including a subcarrier spacing value and a corresponding random access configuration,
where the subcarrier spacing value and the corresponding random access configuration are selected by a network entity from a plurality of subcarrier spacing values and a plurality of random access configurations configured in a target cell of the apparatus,
where the subcarrier spacing value is a first subcarrier spacing value for a physical random access channel, and
where the dedicated radio resource control message further includes information of a second subcarrier spacing value to be used by the apparatus for a data channel and a control channel, and
transmits a random access preamble according to the dedicated random access parameters.

7. The apparatus according to claim 6, wherein the transceiver transmits apparatus capability information, where the subcarrier spacing value and the corresponding random access configuration are based on the apparatus capability information.

8. The apparatus according to claim 6, wherein the dedicated radio resource control message comprises a handover command.

9. The apparatus according to claim 6, wherein transmitting the random access preamble comprises transmitting a random access preamble when performing a random access procedure for recovery from radio link failure.

10. The apparatus according to claim 6, wherein the apparatus is in a radio resource control connected state.

11. A method in a network device, the method comprising:
transmitting a dedicated radio resource control message including dedicated random access parameters dedicated to a user equipment, the dedicated random access parameters including a subcarrier spacing value and a corresponding random access configuration,
where the subcarrier spacing value and the corresponding random access configuration are selected from a plurality of subcarrier spacing values and a plurality of random access configurations configured in the serving cell a target cell of the user equipment,
where the subcarrier spacing value is a first subcarrier spacing value for a physical random access channel, and
where the dedicated radio resource control message further includes information of a second subcarrier spacing value to be used by the user equipment for a data channel and a control channel; and
receiving a random access preamble according to the dedicated random access parameters.

12. The method according to claim 11, further comprising receiving user equipment capability information from the user equipment, where the subcarrier spacing value and the corresponding random access configuration are based on the user equipment capability information.

13. The method according to claim 11, wherein the dedicated radio resource control message comprises a handover command.

14. The method according to claim 11, wherein receiving the random access preamble comprises receiving the random access preamble when performing a random access procedure for recovery from radio link failure.

15. The method according to claim 1, wherein the dedicated radio resource control message comprises a random access channel information element, where the information element includes an index field labeled as Physical Random Access Channel (PRACH) configuration index field, where the PRACH configuration index field indicates the subcarrier spacing value.

16. The apparatus according to claim 6, wherein the dedicated radio resource control message comprises a random access channel information element, where the information element includes an index field labeled as Physical Random Access Channel (PRACH) configuration index field, where the PRACH configuration index field indicates the subcarrier spacing value.

17. The method according to claim 11, wherein the dedicated radio resource control message comprises a random access channel information element, where the information element includes an index field labeled as Physical Random Access Channel (PRACH) configuration index field, where the PRACH configuration index field indicates the subcarrier spacing value.

* * * * *